US006220762B1

(12) United States Patent
Kanai et al.

(10) Patent No.: US 6,220,762 B1
(45) Date of Patent: Apr. 24, 2001

(54) COLLECTIVE CONNECTION STRUCTURE OF A PLURALITY OF OPTICAL CONNECTORS, OPTICAL CONNECTOR ARRAYING MEMBER, AND ADAPTER

(75) Inventors: Ken Kanai; Masata Shiino, both of Tokyo; Takayuki Watanabe; Osamu Suzuki, both of Kawasaki, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/481,532

(22) Filed: Jan. 12, 2000

Related U.S. Application Data

(63) Continuation of application No. PCT/JP99/00503, filed on Feb. 5, 1993.

(51) Int. Cl.[7] .............................. G02B 6/00; G02B 6/36
(52) U.S. Cl. .............................................................. 385/53
(58) Field of Search ............................... 385/50–53, 63, 385/65, 71, 83, 54, 92

(56) References Cited

U.S. PATENT DOCUMENTS

| 4,950,048 | * | 8/1990 | Kakii et al. | 385/33 |
| 5,548,677 | * | 8/1996 | Kakii et al. | 385/92 |
| 5,719,978 | * | 2/1998 | Kakii et al. | 385/89 |
| 5,764,833 | * | 6/1998 | Kakii et al. | 385/54 |
| 6,114,737 | * | 9/2000 | Kakii et al. | 257/434 |

FOREIGN PATENT DOCUMENTS

| 4-174407 | 11/1990 | (JP) | G02B/6/36 |
| 7-270644 | 3/1994 | (JP) | G02B/6/36 |
| 7-270645 | 3/1994 | (JP) | G02B/6/36 |
| 11-52181 | 8/1997 | (JP) | G02B/6/36 |

* cited by examiner

Primary Examiner—Akm E. Ullah
(74) Attorney, Agent, or Firm—Lacasse & Associates; Randy W. Lacasse; Kevin E. Greene

(57) ABSTRACT

The prevent invention relates to a collective connection structure, optical connector arraying member, and adapter, which are suitable for application in the field of optical transmission, and which are able to collectively, easily and accurately connect a plurality of optical connectors with fewer number of parts. Optical connectors (3a) through (3f) and (4a) through (4f) corresponding to the first and second plugs (5) and (6) are arrayed and accommodated in a float-like state. The tip ends of the respective optical connectors protrude from the tip end of the first and second plugs (5) and (6) corresponding thereto. The connection end face (45) side of the respective optical connector groups (3) and (4) is inserted from both sides of the adapter (8) along guides (31) and (33) at both sides of the adapter (8). The optical connectors of the respective connection pairs are position-regulated in the X direction orthogonal to the optical axis and Y direction, thereby causing the axes to be matched, wherein the optical connector groups (3) and (4) are collectively connected via the adapter (8).

3 Claims, 8 Drawing Sheets

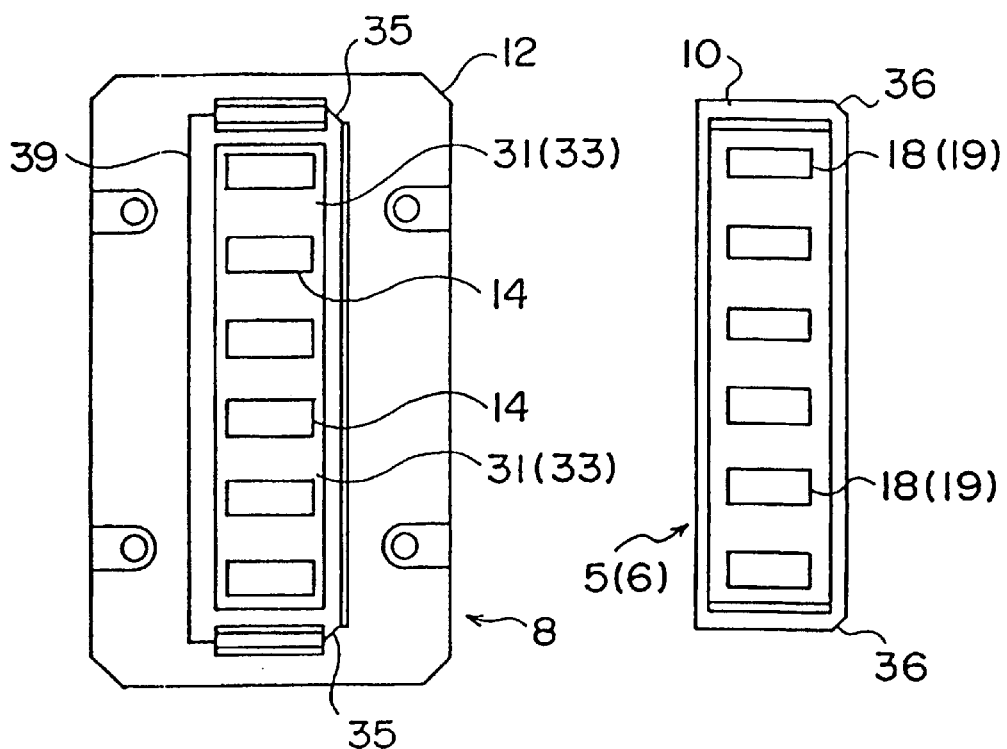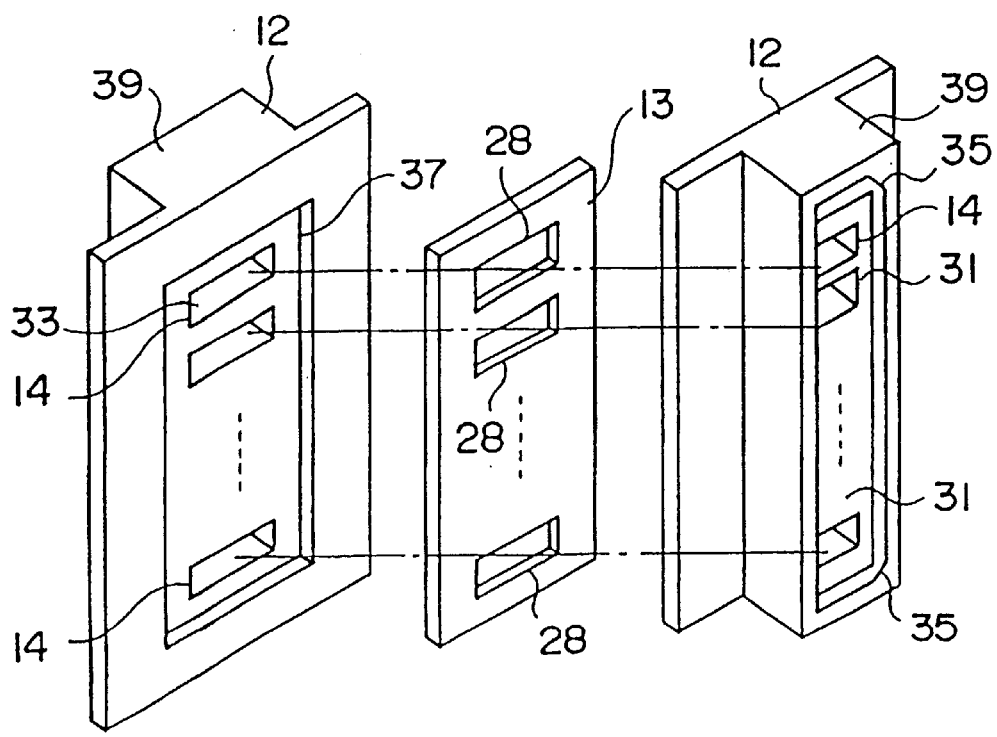

COLLECTIVE CONNECTION STRUCTURE OF A PLURALITY OF OPTICAL CONNECTORS, OPTICAL CONNECTOR ARRAYING MEMBER, AND ADAPTER

This application is a continuation of International Application Number PCT/JP99/00503 filed Feb. 5, 1999, now abandoned.

TECHNICAL FIELD

The present invention relates to a collective connection structure of a plurality of optical connectors to be used in the field of optical communications and to an optical connector arraying member and an adapter which are used in said connection structure.

PRIOR ARTS

FIG. 10 shows an example of a connection for which an optical connector of optical cables in an optical communication network is used. In the same drawing, optical connectors 3a and 4a (the first optical connector 3a and the second optical connector 4a) are such that a multi-fiber optical fiber ribbon 43 is connected to a multi-fiber ferrule 42. In the multi-fiber ferrule 42, a plurality of optical fiber insertion holes 44 are caused to pass through the connection end face 45 from the base end side to the tip end side and are disposed to be arrayed in the cross direction (the width direction of the ferrule) at an equal pitch interval, wherein each of the optical fibers of the multi-fiber optical fiber ribbon 43 is inserted into each of the optical fiber insertion holes 44 and fixed therein, and the tip end side of the fibers are polished together with the connection end face 45.

A pair of alignment holes 46 are formed outside the array group of the optical fiber insertion holes 44 at the connection end face 45. Alignment pins (alignment pins) 47 are previously inserted into these alignment holes 46, and the protrusion tip end side of the alignment pin 47 is inserted into the alignment hole of an optical connector at the connection mating side, whereby the connection end faces 45 of both optical connectors 3a and 4a are brought into contact with each other, and each of the optical fiber ribbons of a multi-fiber optical fiber ribbon 43 at the first optical connector 3a side is axially aligned with and connected to each of the optical fibers of each fiber ribbon to which the multi-fiber optical fiber ribbon 43 of the second optical connector 4a corresponds.

Recently, demand for optical fiber cables has been increasing in line with multi-functioning of optical communication networks. Along with a tendency of multiple fibers, an increase in the number of fibers of optical fiber ribbons of an optical fiber cable has been studied. Under these circumstances, a system of connecting a number of optical fibers of an optical fiber cable by inserting one by one optical connectors 3a and 4a is inefficient. For example, in a case where a 1,000-fiber optical cable of four-core optical fiber ribbon each consisting of 250 fibers is connected, 250 pairs of optical connectors 3a and 4a are required if optical connectors 3a and 4a are connected one by one, and the connection of the optical connectors 3a and 4a are to be carried out 250 times, whereby the ratio of the inserting work of the optical connectors 3a and 4a to the connection work is increased, resulting in efficiency being reduced, and it becomes difficult to cope with the recent trend along which the number of cores of optical fiber cables is increased.

In view of these circumstances, recently, studies on high density, multiplication of cores, and collective connection of optical connectors 3a and 4a have been advanced, and some examples thereof are illustrated in FIG. 11 and FIG. 12.

The examples illustrated in FIGS. 11(a) and (b) are those of high concentration and multiplication cores of optical connectors. The example shown in FIG. 11(a) is a single horizontal row type optical connector which is produced by connecting a plurality (in the drawing, five fibers) of multi-fiber optical fiber ribbons 43 to a multi-fiber ferrule 42 in which a number of optical fiber alignment holes 44 are formed in a single horizontal row, and the example shown in FIG. 11(b) is a matrix type optical connector formed so that optical fiber insertion holes 44 are two-dimensionally arrayed and formed at a multi-fiber ferrule 42 to which a plurality of multiple fiber optical fiber ribbons 43 are connected.

The example shown in FIG. 11(c) is an example of a collective connection of optical connectors, wherein a plurality of first and second laminated optical connectors 3a to 3e and 4a to 4e are, respectively, connected by using lamination pins 48 at each of the first and second optical connectors 3a to 3e and 4a to 4e in order to be made into the first and second optical connector groups, thereby causing the first optical connector group and the second optical connector group to be collectively connected.

Further, the example shown in FIG. 12(a) is also an example of a collective connection. This proposed example is as described below. That is, a plurality of optical connectors 3a to 3e composed by connecting multi-fiber optical fiber ribbons are laminated and accommodated in the opening side at the rear end side in a box-shaped housing 52 having an opening portion 53 at its front end face side, an alignment hole 51 is formed at the four corners of the front end face of the housing 52, and an alignment pin is inserted into the alignment hole 51, wherein one side of an optical connector group laminated in the housing 52 and the optical connector group laminated and accommodated in the other side housing 52 side are composed so that their connection end faces 45 are brought into contact with each other and positioned, thereby a plurality of optical connectors are collectively connected to each other.

The example shown in FIG. 12(b) is such that a housing-accommodated optical connector is push-on engaged with another connector via an adapter 8. For example, by engagement of a claw portion 15 of the housing 52 with the projection portion 16 of the adapter 8, housing-accommodated optical connectors opposed to each other (the optical connector illustrated in the same drawing and a connection mating side housing-accommodated optical connector not illustrated) are able to be connected to each other.

Actually however, the following problems occurred in high concentration, multiplication of cores and collective connection according to each of the abovementioned proposed optical connectors. In an optical connector shown in FIG. 11(a), since the optical fiber array direction (the array direction of optical fiber insertion holes 44) is long, the multi-fiber ferrule 42 is liable to be warped when molding the same or while using the same. In addition, in an optical connector shown in FIG. 11(b), since the working efficiency of inserting optical fibers is not good, and it is difficult to prepare metal dies for molding multi-fiber ferrules 42, the optical connector is not suitable for mass production.

Further, since a collective connection shown in FIG. 11(c) requires laminating pins 48, pin retaining members for fixing the laminating pins 48, and clamp springs for retaining the connected state of optical connectors, the number of components will be increased, wherein the optical connectors must be handled and laminated by hand, and a number of components must be also handled and assembled by hand. Therefore, assembling is very cumbersome.

In addition, the example shown in FIG. 12(a) requires positioning pins for positioning the housings 52 in each of which an optical connector is accommodated, in addition to the positioning pins of optical connectors, and the number of components is also increased. Moreover, there is a limitation in the housing in that the correlation between the alignment pins 51 and a group of optical connectors must be accurately produced. In addition, since, in the example shown in FIG. 12(b), the adapter 8 is empty or hollow and the adapter is prepared for only connection to the housing 52, the housing 52 must be produced to be highly accurate and optical connectors must be accommodated therein with high accuracy in order to accurately position optical connectors to be connected. Therefore, the production cost of the housing 52 will be remarkably increased.

The present invention was developed to solve the abovementioned themes, and it is therefore an object of the invention to provide a collective connection structure which is easily produced and handled, and which is able to accurately carry out a collective connection of a plurality of optical connectors and is able to decrease the parts cost necessary for connections, and to provide an optical connector arraying member and an adapter, which are used for the connection structure.

DISCLOSURE OF THE INVENTION

In order to solve the abovementioned objects, the invention is constructed as described below. That is, a collective connection structure of a plurality of optical connectors which collectively connects a first optical connector group in which a plurality of optical connectors are arrayed in a first optical connector arraying member in a stacked state and a second optical connector group in which a plurality of optical connectors are arrayed in a second optical connector arraying member in a stacked state, via an adapter having a guide portion provided, in such a state where the connection end faces of the respective first and second optical connector groups are opposed to each other;

wherein the connection end face side of each of the first and second optical connector groups is caused to protrude from the tip end of the corresponding first and second optical connector arraying members so as not to slip off, and the first and second optical connector groups are arrayed to be like a float in the X direction orthogonal to the optical axis of optical connectors and Y direction with respect to the corresponding first and second optical arraying members, and the respective connection end face sides of the first and second optical connector groups protruding from the first and second optical connector arraying members are inserted from both sides of said adapter, and the first and second optical connector groups are collectively connected so that, at the connection end face sides of the respective first and second optical connectors, the positions of said X direction and Y direction of optical connectors of connection pairs of the first and second optical connector groups are regulated by a plurality of guide portions for each optical connector of the respective connection pairs provided at the adapter, and wherein a plurality of connector inserting holes into which the respective optical connectors of the group of optical connectors are inserted, are arrayed and formed in a stacked state in the optical connector arraying member, the respective optical connectors of the group of optical connectors inserted into the connector inserting holes are engaged with a drop preventing and engaging portion, which is provided in the connector inserting holes, and the connection end face sides of the respective optical connectors protrude from the tip end of the connector inserting holes, wherein inserting holes are formed on the wall surface of the respective connector inserting holes, stoppers are inserted into the respective connector inserting holes from the rear end side, the latch portions provided on the outer circumferential surface of the corresponding stoppers are engaged with the abovementioned latch engaging hole, the stoppers are provided in the connector inserting holes, and a spring which presses the optical connectors to the tip end side of the connector inserting holes is accommodated in a space between the tip end of the stopper and the rear end side of the optical connector.

Moreover, an optical connector arraying member used for a collective connection structure of said plurality of optical connectors is such that a plurality of connector inserting holes which accommodate respective optical connectors of a group of optical connectors in a floating state in the X direction orthogonal to the optical axis of the optical connectors and Y direction are arrayed and formed in a stacked state, a drop preventing portion which prevents optical connectors from protruding toward the tip end side of insertion of the optical connectors to be inserted is provided in the respective connector inserting holes, a stopper is inserted into the respective connector inserting holes from the rear end side thereof, wherein the latch portion secured on the outer circumferential surface of the stopper is engaged with the latch engaging hole to cause the stopper to be attached in the connector inserting hole, and a spring which presses the optical connectors to the tip end side of the connector inserting hole is accommodated in a space of the connector inserting hole between the tip end of the stopper and the rear end side of the optical connector.

Further, construction of an adapter of a collective connection of a plurality of optical connectors is provided with a plurality of guide portions protruding and formed in a direction of receiving the insertion of optical connectors, which regulate the position in the X direction and Y direction orthogonal to the optical axis of the optical connectors with respect to the respective optical connectors of the first and second optical connector groups inserted from both sides of the adapter to the corresponding adapter, wherein the entire body including this guide portion is composed of a material containing a conductive material.

In the invention constructed as described above, the connection end face side of each of the first and second optical connectors is caused to protrude from the tip end of the corresponding first and second optical connector arraying members, and the first and second optical connector groups are arrayed in a floating state in the X direction and Y direction orthogonal to the optical axis of the optical connectors with respect to the corresponding first and second optical connector arraying members. However, the connection end face side of the first and second optical connector groups respectively protruding the first and second optical connector arraying members are inserted from both sides of the adapter, whereby the positions of optical connectors of each connection pair in the abovementioned X and Y directions are regulated by guide portions for each optical connector of the respective connection pairs secured at the adapter, and the first and second optical connector groups are collectively connected.

Thus, with the invention, it is possible to collectively connect a plurality of optical connectors without any arraying members or new connection pins (positioning pins), etc., for connection of optical connectors, and the position of the first and second optical connectors in the abovementioned X direction and Y direction are not regulated by the optical connector arraying members, but the same is regulated by the guide portion of the adapter. Therefore, a collective connection of a plurality of optical connectors can be very accurately and easily carried out even though the optical connectors are not accurately arrayed in the optical connector arraying members, and the connection is also easy. Moreover, as described above, since it is not necessary to accurately array optical connectors in the optical connector arraying members, production of the optical connector arraying members can be facilitated, resulting in a decrease in component costs.

In a more detailed description, according to a collective connection structure of a plurality of optical connectors in compliance with the present invention, as described above, the connection end face side of the first and second optical connector groups is arrayed in a floating state with respect to the corresponding first and second optical connector arraying members and are fitted with both sides of the adapter, wherein the position of optical connectors of the respective connection pairs of the first and second optical connector groups is regulated by guide portions of the adapter, thereby causing a collective connection thereof to be performed. Therefore, a collective connection of a plurality of optical connectors can be accurately and easily carried out, without any connection pin required for positioning, by the first and second optical connector arraying members and adapter even though the dimension accuracy of the first and second optical connector arraying members is not very accurate, (in an easy-to-handle way). In addition, as described above, the dimension accuracy of the first and second optical connector arraying members may not be very high. Since a plurality of optical connectors may be accurately and collectively connected to each other by using an adapter in which guide portions for regulating the position of the first and second optical connector groups are provided, the connection performance may be efficient, and the parts cost required for connection may be further decreased.

Further, an optical connector arraying member of a collective connection structure of a plurality of optical connectors according to the invention is such that a plurality of connector inserting holes into which optical connectors corresponding thereto are inserted are formed, wherein by only inserting optical connectors into the respective optical connector inserting holes, the optical connectors are held with a drop preventing portion inside the connector inserting hole to prevent them from drop in the inserting direction, and with only an operation by which a spring and a stopper are inserted in the connector inserting hole at the rear end side of the optical connector, the latch portion of the stopper is automatically engaged with the inserting hole of the connector inserting hole, thereby causing assembly of the optical connector arraying member to be remarkably easily assembled. Since the optical connector is accommodated in the connector inserting hole in a floating state, the dimensional accuracy, etc., of the connector inserting hole may not be so high, wherein it is possible to easily produce the optical connector arraying member, and since it is remarkably easy to assemble the same as described above, the production cost may be decreased.

An adapter of a collective connection structure of a plurality of optical connectors according to the invention may have a simple structure which is provided with guide portions for regulating the position with respect to the respective optical fibers of the first and second optical connector groups. Therefore, the production of the adapter is easy, resulting in a decrease in the parts cost.

The adapter is constructed to include the conductive material as described above, and since it is possible to secure continuity to the frame of a measurement instrument if the adapter is attached to the frame thereof, any erroneous operation in the other measurement instruments and computer, which may result from electromagnetic waves generated from electronic components inside the frame of the measurement instrument, can be prevented.

BRIEF DESCRIPTION OF THE DRAWINGS

FIGS. 3(a) and (b) are an explanatory view of a construction showing a relationship between an adapter according to the abovementioned preferred embodiment and positioning of a plug, wherein (a) is a front elevational view of the adapter, and (b) is a front elevational view of the first and second plugs;

FIG. 4 is a disassembled view of the adapter according to the abovementioned preferred embodiment;

BEST MODE FOR CARRYING OUT THE INVENTION

Figure 1:
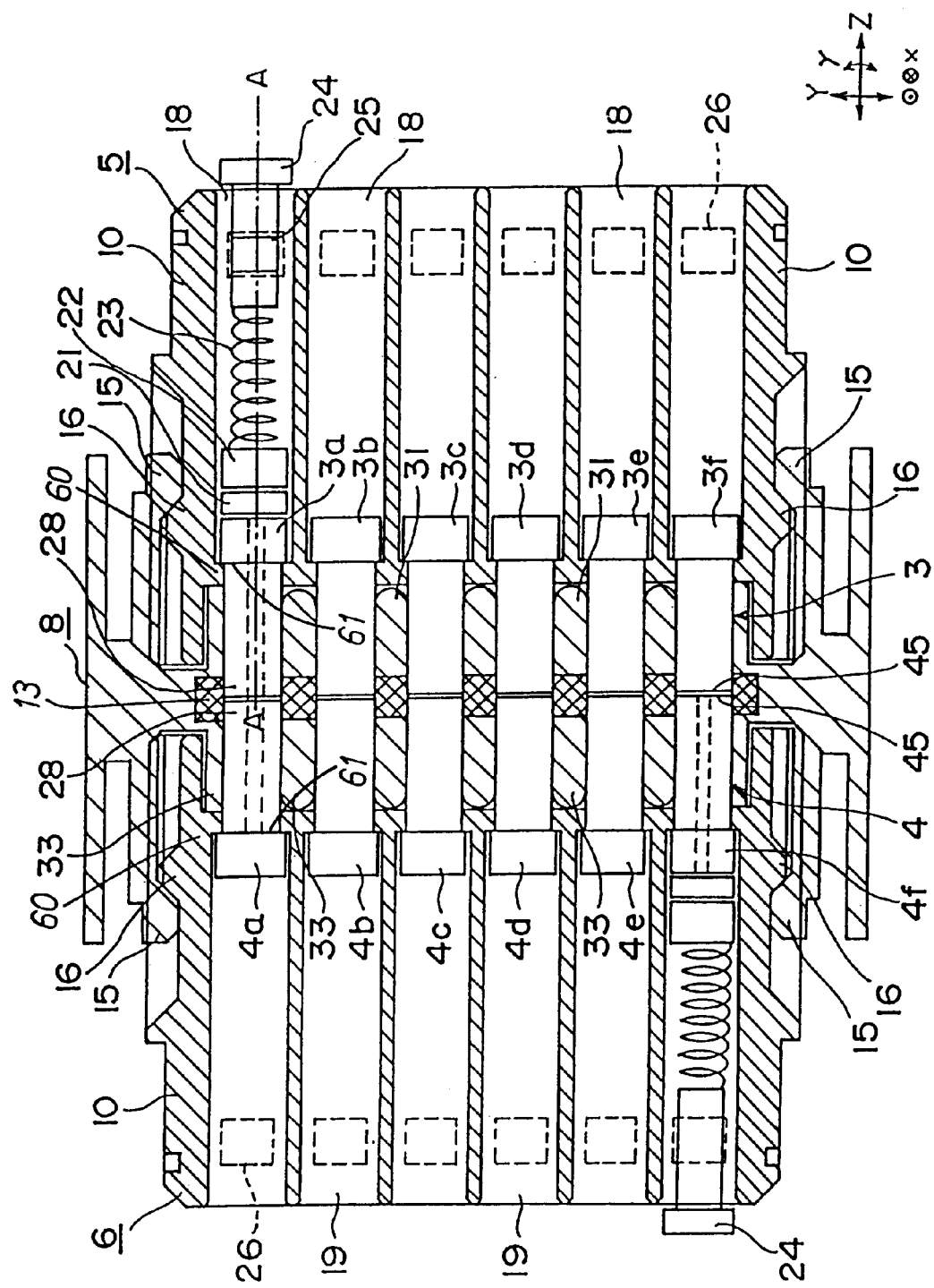
FIG. 1 is a cross-sectional view showing major parts of a preferred embodiment of a collective connection structure of a plurality of optical connectors according to the invention.

Hereinafter, in order to describe the present invention in detail, a description will be given of a preferred embodiment of the invention with reference to the accompanying drawings. Also, in the description of the preferred embodiment, parts that are identical to those in the prior art example are given the same reference number, and their overlapping description is omitted or simplified. FIG. 1 is a cross-sectional view showing major parts of a preferred embodiment of a collective connection structure of a plurality connectors according to the invention. In the same drawing, the first optical connectors 3a to 3f are caused to be stacked each other in the first plug acting as the first optical connector arraying member and arrayed therein, and are made into the first optical connector group 3, and the second optical connectors 4a to 4f are caused to be stacked each other in the second plug 6 acting as the second optical connector arraying member and arrayed therein, and are made into the second optical connector group 4. The respective first and second optical connector groups 3 and 4 are collectively connected to each other by an adapter 8 with the connection end faces 45 thereof opposed to each other.

Figure 2:
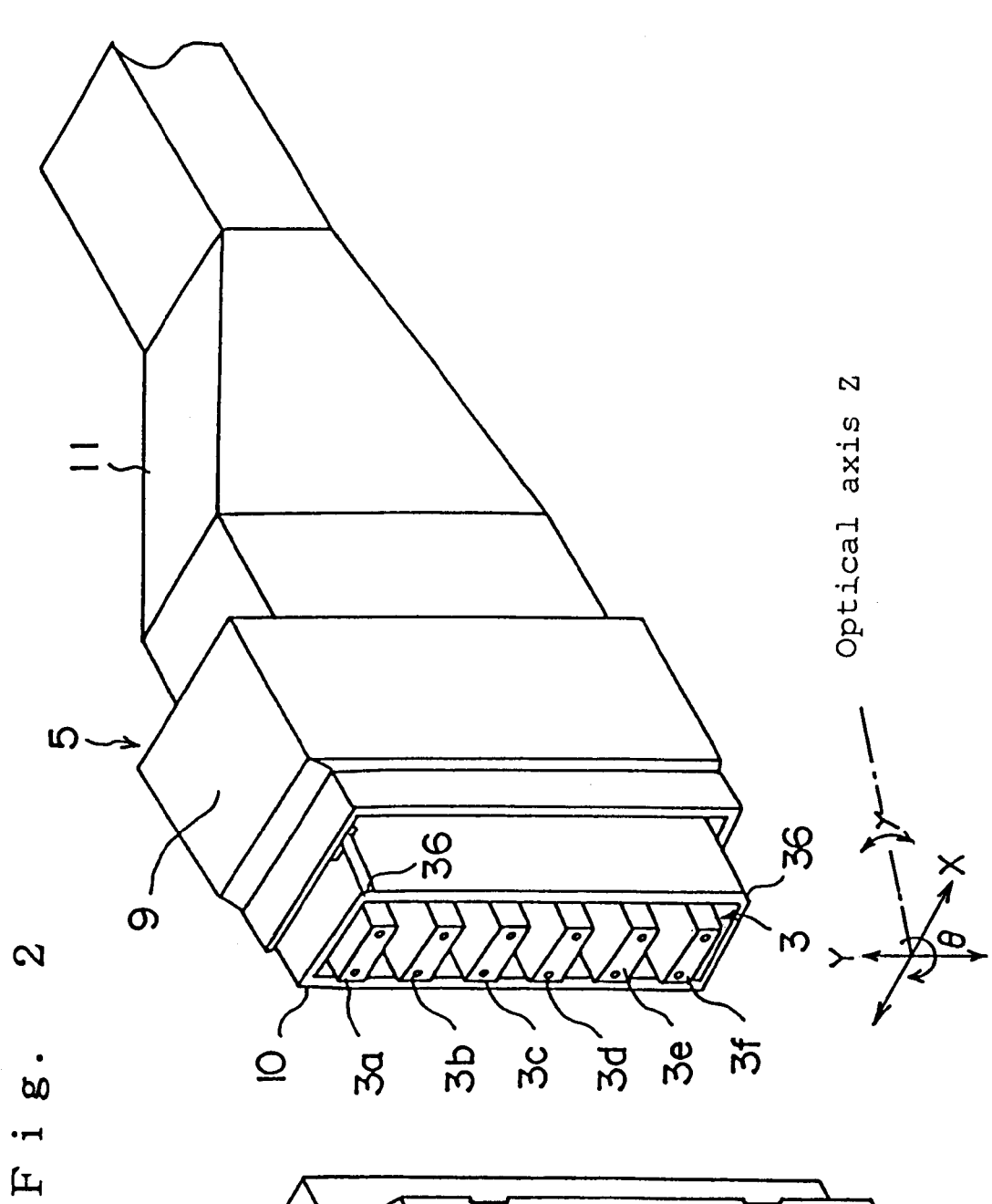
FIG. 2 is a perspective view showing the adapter and first plug of the abovementioned preferred embodiment.

Further, FIG. 2 is a perspective view of the first plug 5 and adapter 8 which are used for a collective connection structure of a plurality of optical connectors according to the preferred embodiment. As shown in the same drawing, the first plug is constructed so as to have a frame 10, a slider 9 and a boot 11. Similarly, the second plug is constructed so as to have a frame 10, a slider 9 and a boot 11. However, in FIG. 1, the slider 9 and boot 11 of the first and second plugs 5 are omitted.

As shown in FIG. 1, a plurality of connector inserting holes 18 and 19, into which optical connectors (first and second optical connectors 3a through 3f, and 4a through 4f) corresponding to the first and second plugs 5 and 6 are inserted, are arrayed and formed in a stacked state in the first and second plugs 5 and 6. In front of these connector inserting holes 18 and 19, drop preventing portion 60 is formed so as to protrude inwardly like a projection. By a staged portion 61 at the rear part side of the optical connector being engaged with the abovementioned drop and engaging portion connectors 3 and 4 is engaged in the connector inserting holes 18 and 19, in a state where they protrude from the tip end of the connector inserting holes 18 and 19, so that the optical connectors 3 and 4 are prevented from dropping toward the tip end of the holes 18 and 19. And, the connection end surface 45 sides of the group of the first and second optical connectors 3 and 4 protrude from the tip end of the first and second plugs 5 and 6. Also, the first and second optical connector groups 3 and 4 are arranged, with respect to the corresponding first and second plugs 5 and 6, to be float (in a free and idle state) like in the X and Y directions orthogonal to the optical axis of optical connectors, in a rotation θ direction on the XY plane, and in an inclination γ direction of the optical axis of the optical connector, wherein the respective optical connectors 3a to 3f and 4a to 4f are respectively arrayed in a floating state in the abovementioned X and Y directions, θ direction, and γ direction by a connector stopping means secured at the first and second plugs 5 and 6, that is, pin retaining parts 21, pin retaining portion base 22, spring 23 and stopper 24, and are stopped and prevented from dropping backward in the respective connector inserting holes 18 and 19. In addition, the pin retaining parts 21 (or pin retaining parts 21 and pin retaining part base 22) are provided at one side of holes 18 and 19 which will be a connection pair.

Figure 5:
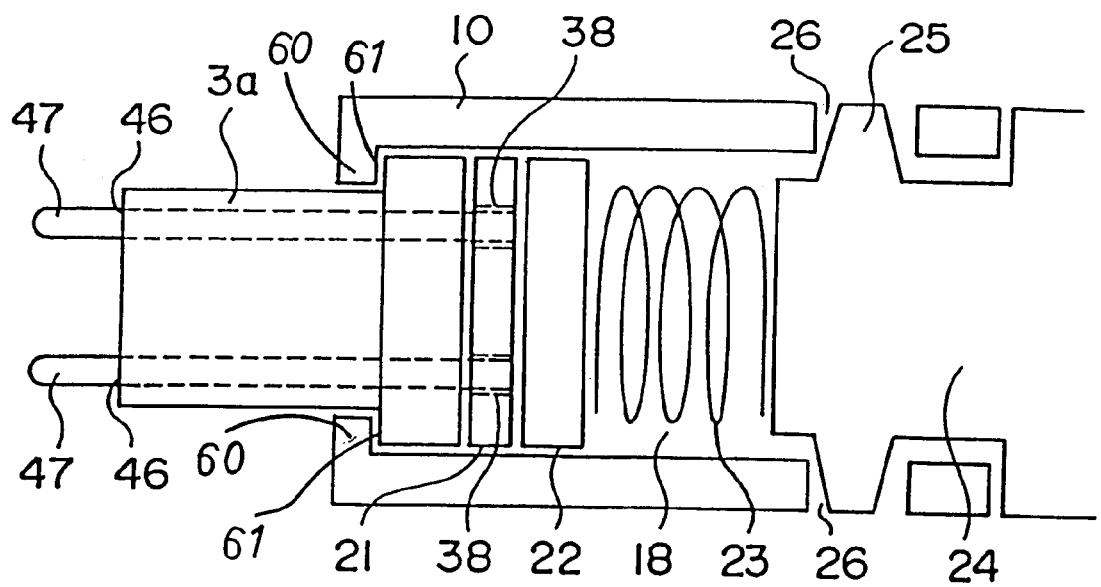
FIG. 5 is a cross-sectional view taken along the line of A—A in FIG. 1.
Figure 6:
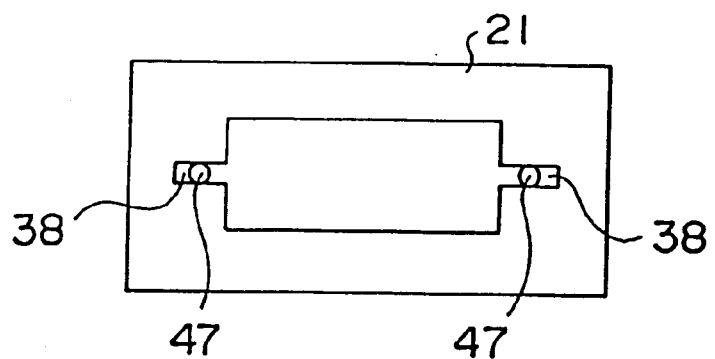
FIG. 6 is an explanatory view of a pin retaining part used in the above preferred embodiment.

In addition, FIG. 5 shows a cross-sectional view taken along the line A—A in FIG. 1. As shown in the same drawing, in the preferred embodiment, since a latch portion 25 secured at the stopper 24 is engaged with the inserting hole 26 secured at the frame 10, the respective optical connectors (the optical connector 3a in FIG. 5) are pressed forward by a pressing force of the spring 23 to cause the first and second optical connectors 3a to 3f and 4a to 4f to be stopped and prevented from dropping in the respective connector inserting holes 18 and 19. Also, as shown in FIG. 5, alignment pins 47 are inserted into the alignment holes 46 of the respective optical connectors 3a to 3f of the first optical connector group 3 before being connected to the second connector group 4, wherein the respective alignment pins 47 are fixed in a state where the same are fixed to be pressed into the pin retaining portion 38 of the pin retaining component 21 shown in FIGS. 5 and 6. Moreover, in FIG. 5, the pin retaining part 21 is depicted at the optical connector 4f side. However, in a case where the pin retaining part 21 is secured at the optical connector 3f side, no pin retaining part 21 (or fixing part and pin retaining part base 22) is secured at the optical connector 4f side.

As shown in FIG. 1, a latch portion 16 for inserting with the adapter 8 is formed at the upper and lower parts of each frame 10 of the first and second plugs 5 and 6, and the projection portion 16 is ridge-like, the dimension of which is for example, 8.4 mm wide and 0.9 mm high. Further, as shown in FIG. 3, a notched part 36 is formed at two points of the four corners of the outer surface of the frame 10. Still further, multi-fiber optical fiber ribbons 43 (not illustrated in the same drawing) which form the first and second optical connector groups 3 and 4 are collectively accommodated in a boot 11 (FIG. 2) of the first and second plugs 5 and 6.

As shown in FIG. 1 and FIG. 4, the adapter 8 is constructed to have two housing halves 12 of almost the same shape and a metallic plate 13. The housing halves 12 are inserted back to back and, for example, are welded by ultrasonic welding. At each of the housing halves 12, a plurality of the first and second guides 31 and 33 are formed to protrude in the direction (horizontal direction) along which the insertion of optical connectors is received, as a guide member which regulates the position of the first and second optical connector groups 3 and 4 inserted into the adapter 8 from both sides of the adapter 8 in the X direction and Y direction orthogonal to the optical axis of the optical connectors, the abovementioned θ direction and γ direction with respect to the respective optical connectors 3a through 3f and 4a through 4f. In addition, in the preferred embodiment, the first guides 31 are interlinked with each other by the vertical wall of both width end portions and the second guides 33 are interlinked with each other as well. The first guide 31 functions as the first guide portion at the first plug 5 side, and the second guide 33 functions as the second guide portion at the second plug 6 side. A plurality of the first guides 31 and the second guides 33 are aligned with each other so that their width positions and height positions are made coincident with each other. The metallic plate 13 is caused to intervene between the first guides 31 and the second guides 33, and the metallic plate 13 has through holes 28 formed at the position corresponding to the hole space enclosed by the inner circumferential wall 14 of the first and second guides 31 and 33, through which optical connectors are inserted. The through holes 28 are rectangular, and the diagonal line thereof is about 15 mm long.

Further, as shown in FIG. 3(a), a notched inserting portion 35 is formed at two of the four corners of the inner wall of the frame portion 39 at the housing halves 12 of the adapter 8, and the notched inserting portion 35 corresponds to the notched part 36 formed at the frame 10 of the second plugs 5 and 6. When inserting the first and second plugs 5 and 6 in the adapter 8, no error occurs with respect to the vertical direction (the optical connector arraying direction), that is, for example, the second connector 4a of the second connector group 4 is connected to the first connector 3a of the first connector group 3 without fail.

As shown in FIG. 1, claw portions 15 are formed at the inserting side of the adapter 8 to the first and second plugs 5 and 6, and these claw portions 15 are caused to ride beyond the projection portion 16 secured at the first and second plugs 5 and 6, and are engaged with the projection portions 16, whereby the first and second plugs 5 and 6 are detachably connected via the adapter 8. The claw portions 15 are, for example, 8 mm wide, 1.2 mm thick, and 0.9 mm high, and the inserting force of the adapter 8 and the first and second plugs 5 and 6 is for example, 6 kgf or more.

As shown in FIG. 1, the protrusion tip end side of the first and second guides 31 and 33 is made round, and the size of a hole (a hole into which an optical connector is inserted and inserted) enclosed by the inner circumferential wall 14 between the upper and lower guides of the first and second guides 31 and 33 is formed to be, for example, 2.5+0.01 to 0.1 mm high, and 6.4+0.01 to 0.1 mm wide, which is slightly larger than the outside dimension (2.5 mm high and 6.4 mm wide) of the first and second optical connectors 3a to 3f and 4a to 4f.

In the preferred embodiment, each connection end face 45 side of the first and second optical connector groups 3 and 4 protruding from the first and second plugs 5 and 6 is inserted from both sides of the adapter 8 by inserting of the abovementioned first and second plugs 5 and 6 and the adapter 8. The position of the connection end face 45 side of each of the first and second optical connectors 3a to 3f and 4a to 4f is regulated by the first and second guides 31 and 33 for each optical connector of a plurality of connection pairs secured at the adapter 8 with respect to the abovementioned X direction and Y direction, θ direction and γ direction, whereby the first and second optical connector groups 3 and 4 are collectively connected to each other.

Figure 7A:
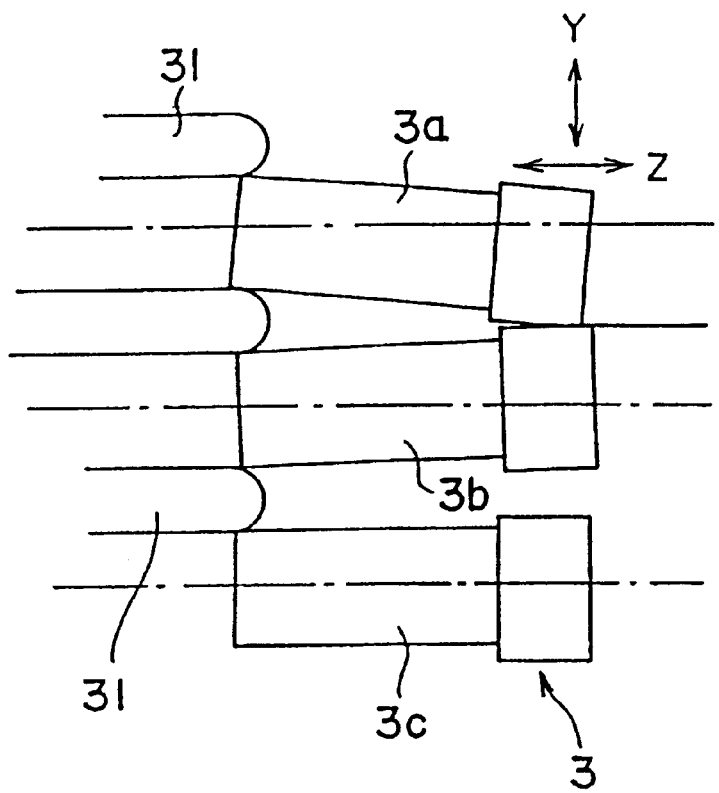
FIGS. 7(a) and (b) are an explanatory view showing a position regulating action of the first optical connector group 3 by the first guide 31 when the first plug used in the abovementioned preferred embodiment is inserted into the adapter.
Figure 7B:
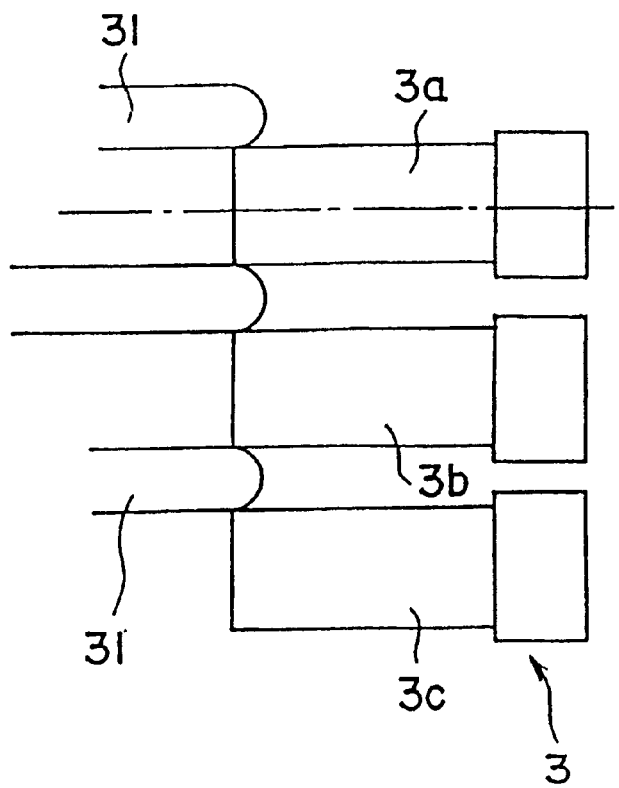

Since the preferred embodiment is constructed as described above, the first and second optical connector groups 3 and 4 are arrayed in a floating state in the abovementioned X and Y directions, θ direction and γ direction with respect to the corresponding first and second plugs 5 and 6. However, if the first and second plugs 5 and 6 are inserted from both sides of the adapter 8, for example, as shown in FIG. 7(a), the position of the first and second plugs 5 and 6 is regulated in the Y direction in the drawing by the first guide 31 even though the connection end face 45 side of the first connector 3a of the first optical group 3 is caused to protrude diagonally (that is, in an inclined state in the γ direction), and as shown in FIG. 7(b), each of the first optical connectors 3a to 3f (the optical connectors 3d to 3f are not illustrated herein) is inserted into the first guide 31 in an aligned state. Accordingly, similarly, each of the second optical connectors 4a to 4f of the second optical connector group 4 is position-regulated by the second guide 33 and aligned, whereby the optical connectors of the respective connection pairs of the first and second optical connector groups are correctly positioned and aligned.

According to the preferred embodiment, as described above, by inserting the first and second plugs 5 and 6 from both sides of the adapter 8, the respective optical connectors 3a to 3f and 4a to 4f of the first and second optical connector groups 3 and 4 are position-regulated and aligned by the first and second guides 31 and 33 of the adapter 8 and connected to each other. Therefore, the connection does not need any pin, etc. for positioning the first and second plugs 5 and 6, and adapter 8 and a collective connection of a plurality of optical connectors can be accurately carried out with fewer numbers of components. Thus, since the respective optical connectors 3a through 3f and 4a through 4f of the first and second optical connector groups 3 and 4 are position-regulated and aligned by the first and second guides 31 and 33 of the adapter 8, it is possible to collectively connect optical connectors of the first and second optical groups 3 and 4 even in a case where no alignment pin as shown in FIG. 5 is used.

In particular, in the preferred embodiment, since the protrusion tip end side of the first and second guides 31 and 33 are made round and can absorb inclination, etc. of the first and second optical connector groups 3 and 4 arrayed in a floating state in the first and second plugs 5 and 6 (that is, the same can correct the orientation thereof), it is possible to easily align the first and second optical connector groups 3 and 4 with each other. Therefore, a collective connection of the first and second optical connector groups 3 and 4 can be securely and accurately carried out.

In addition, by only inserting an optical connector, pin retaining part 21 provided with an alignment pin 4, pin retaining part base 22, spring 23, and stopper 24 in order into a connector inserting hole, one end side of the first and second plugs 5 and 6 is completely assembled by the latch portion 25 of the stopper 24 being automatically engaged with the inserting hole 26. And, by only inserting an optical connector, pin retaining part base 22 (there is a case where the pin retaining part seat is omitted), spring 23 and stopper 24 in order into the connector inserting hole, the other end side of the first and second plugs 5 and 6 is completely assembled by the latch portion 25 of the stopper 24 being automatically engaged with the inserting hole 26. Therefore, assembly of the first and second plugs 5 and 6 is carried out remarkably easily.

In addition, according to the preferred embodiment, it is possible to easily produce an adapter 8 by inserting back to back two housing halves 12 formed to be almost the same and causing a metallic plate 13 to intervene between the two housing halves 12. Also, since the position of the first and second optical connector groups 3 and 4 is regulated by the adapter 8, it is not necessary to secure accurate dimensions of connector inserting holes 18 and 19, etc., of the first and second plugs 5 and 6. Therefore, it becomes possible to easily produce the first and second plugs 5 and 6, resulting in a decrease in the total parts cost of adapter 8, and first and second plugs 5 and 6 necessary for connection.

Figure 11A:
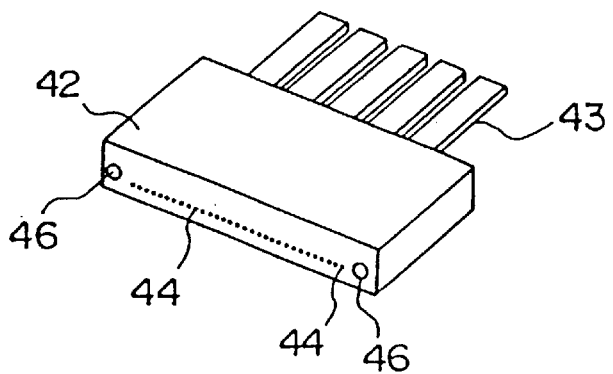
FIGS. 11a–c are a view showing one example of a conventional collective connection structure of super multi-fiber optical connectors and a plurality of optical connectors.
Figure 11B:
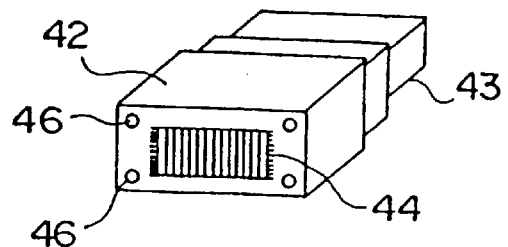
Figure 11C:
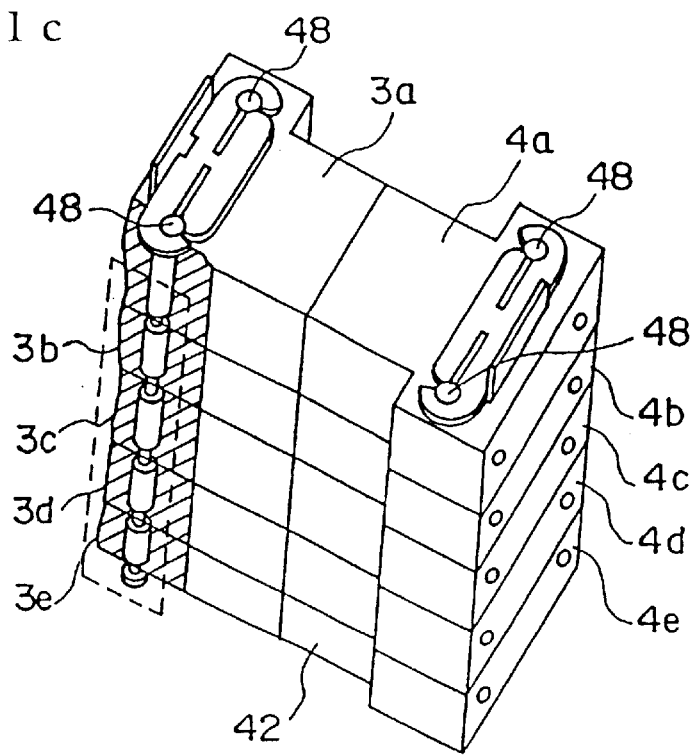

Moreover, in the preferred embodiment, the respective optical connectors 3a to 3f and 4a to 4f of the first and second optical connector groups 3 and 4 are 12-fiber optical connectors which have been generally known. For example, differing from an optical connector in which a large-sized super multi-fiber ferrule is shown in FIGS. 11(a) and (b), the optical connectors 3a to 3f and 4a to 4f are excellent in view of moldability and mass productivity of multi-fiber ferrules 42 and attaching efficiency of optical fibers. Therefore, it is possible for a super multi-fiber optical connector consisting of, for example, 72 fibers to be easily and accurately connected at low cost by a collective connection of the first and second optical connector groups 3 and 4.

Further, since a notched part 36 is formed at each frame of the first and second plugs 5 and 6, and a notched inserting portion 35 which is inserted into the notched part 36 is formed at the frame portion 39 of the housing 12 of the adapter 8, the optical connectors of the respective connection pairs can be secured without fail so that, for example, the first optical connector 3a is connected to the second optical connector 4a, whereby it is possible to prevent any error in mating of the connection pairs.

In addition, according to the preferred embodiment, the first and second plugs 5 and 6 have a boot 11 which collectively accommodates multi-fiber optical fiber ribbons 43 of the first and second optical connector groups 3 and 4. Since the multi-fiber optical fiber ribbons 43 are collectively accommodated, interference of the multi-fiber optical fiber ribbons 43 can be eliminated, and it is possible to easily handle the first and second optical connector groups 3 and 4.

Figure 12A:
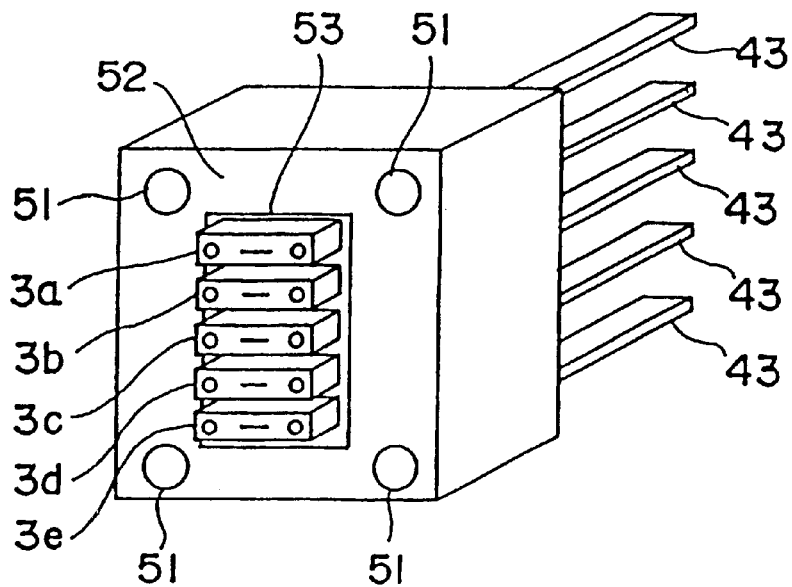
FIGS. 12a–b are a view showing another example of a conventional collective connection structure of a plurality of optical connectors.
Figure 12B:
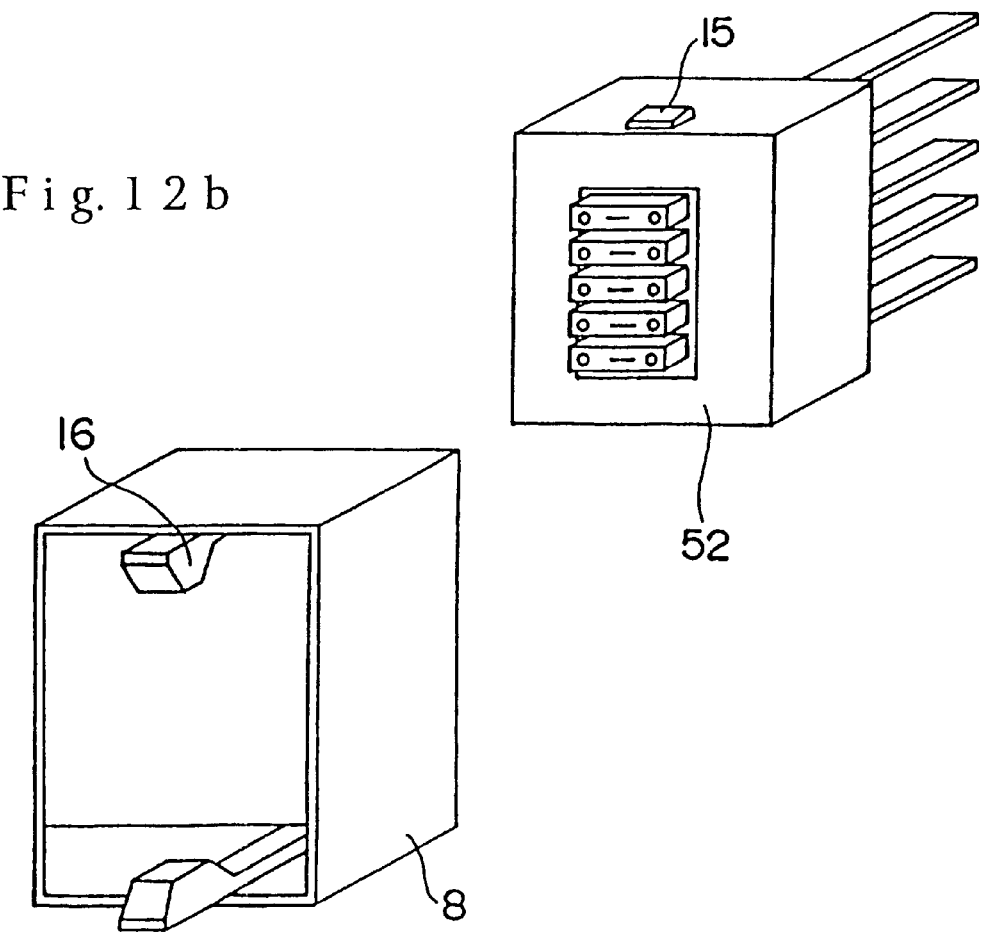

Moreover, for example, as shown in FIG. 12(b), in a case where the inside of the adapter 8 is made empty, there is a fear that when the adapter 8 is attached to the frame of a measurement instrument, electromagnetic waves generated by electronic components inside the frame of the measurement instrument leaks out of the empty section of the adapter 8 and causes erroneous operations in other measurement instruments and the computer, etc. However, in the preferred embodiment, since a metallic plate is put between the housing halves 12 of the adapter 8 and continuity with the frame of measurement instrument can be secured, it is possible to prevent any erroneous operations in the measurement instruments, computer, etc., while preventing adverse influences due to the abovementioned electromagnetic waves.

Still further, the invention is not limited to the abovementioned preferred embodiment. Various modifications and variations can be obtained. For example, although in the abovementioned preferred embodiment, the adapter 8 is formed by causing a metallic plate to intervene between the housing halves 12 of the adapter 8, the adapter is not necessarily limited to the abovementioned case in which a metallic plate is caused to intervene between the housing halves 12 of the adapter 8. For example, the same may be formed so as to have a conductive material such as conductive plastic, etc. Thus, if the adapter 8 is formed of a conductive material, it is also possible to secure continuity with the frame of the measurement instruments as in the adapter 8 in which a metallic plate 13 is caused to intervene between the housing halves 12 as in the abovementioned preferred embodiment. Therefore, as in the abovementioned preferred embodiment, it is also possible to prevent any erroneous operation in the other measurement instruments, computer, etc. which may be generated by electromagnetic waves. Since work for inserting a metallic plate is omitted, it becomes easier still to produce an adapter 8.

Also, the adapter 8 is not necessarily formed so as to only have a metallic plate 13 as in the abovementioned preferred embodiment and to also include a conductive material as described above, the same can be constructed so that it does not have either of them. However, in a case where the adapter 8 is attached to the frame of a measurement instrument, it is preferable that the adapter 8 is formed so as to include a conductive material or to have a metallic plate 13, in order to prevent any erroneous operation in the other measurement instruments, computer, etc., resulting from leakage of the abovementioned electromagnetic waves.

In addition, in the abovementioned preferred embodiment, although the adapter 8 is formed by welding two housing halves 12 together, the adapter 8 may have the two housings 12 connected together by screws, etc. instead of welding, and the adapter 8 may be an integrally formed member instead of being constructed of two housing halves 12.

Figure 9:
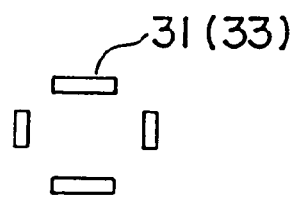
FIG. 9 is an explanatory view of the guide portion according to another preferred embodiment of the adapter used for a collective connection structure of a plurality of optical connectors according to the invention.
Figure 8:
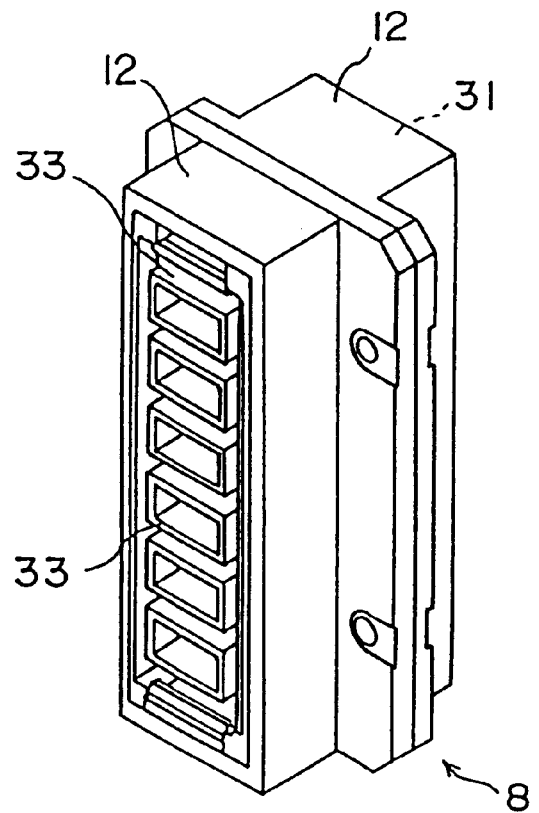
FIG. 8 is an explanatory view of another preferred embodiment of the adapter used for a collective connection structure of a plurality of optical connectors according to the invention.
Figure 10:
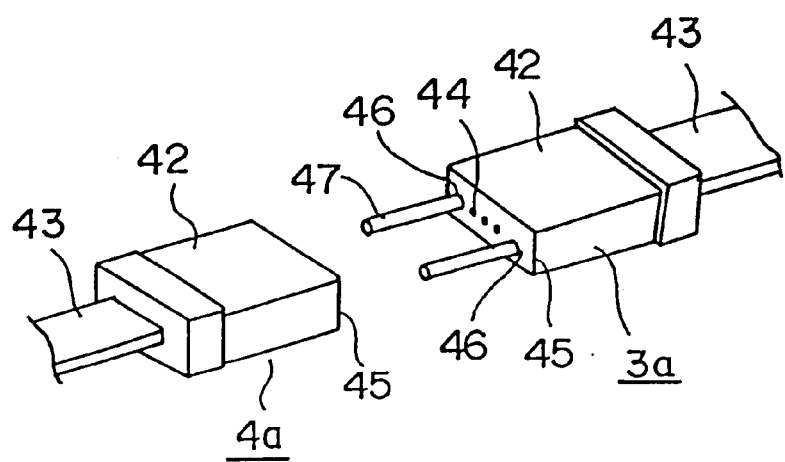
FIG. 10 is a view showing a connection method of general multi-fiber optical connectors.

Further, in the abovementioned preferred embodiment, although it is constructed so that the first and second guides 31 and 33 regulate the position of both optical connectors (common) (for example, optical connector 3a and optical connector 3b) at both the upper and lower sides of the respective guides 31 and 33, for example, as shown in FIG. 8, a frame-like guide may be provided, which regulates the position for each optical connector, to cause the adapter 8 to be constructed. In addition, the frame may not be formed of a continuous wall frame, but, for example, may be formed of a non-continuous frame (intermittent frame) as shown in FIG. 9.

Moreover, in the abovementioned preferred embodiment, although the protrusion tip end side of the first and second guides 31 and 33 is formed so as to be made round, the protrusion tip end side of the first and second guides 31 and 33 is not necessarily limited to a round shape. However, as in the abovementioned preferred embodiment, by making the protrusion tip end side of the first and second guides 31 and 33 round, it is possible to smoothly regulate the position of the first and second optical connector guides 3 and 4 arrayed in a floating state. Therefore, it is highly recommended that the protrusion tip end side of the first and second guides 31 and 33 is formed to be round.

Further, in the abovementioned preferred embodiment, a notched inserting portion 35 is formed at two of the four corners of the frame portion 39 of the adapter 8 and a notched part 36 is also formed at two of the respective four corners of the frame 10 of the first and second plugs 5 and 6. However, the notched inserting portion 35 of the frame portion 39 and the notched part 36 of the frame 10 may be omitted. However, in this case, as in the above preferred embodiment, in order to securely connect the optical connectors of the respective connection pairs of the first connector group 3 and the second connector group 4 (so as not make any mistake in the mating of each connection pair), it is preferable that a certain type of marking is attached to the adapter 8 and the first and second plugs 5 and 6.

Further, in the abovementioned preferred embodiment, by engaging a projection portion 25 of the stopper 24 in the inserting hole 26 formed at the frame 10 of the first and second plugs 5 and 6, the first and second optical connector groups 3 and 4 are stopped in and engaged in the connector inserting holes 18 and 19 of the first and second plugs 5 and 6. However, it is not necessarily limited that the connector engaging means for engaging the first and second optical connector groups 3 and 4 in the connector inserting holes 18 and 19 is engaged in the frame 10 of the stopper 24.

In addition, in the abovementioned preferred embodiment, although the first and second plugs 5 and 6 are constructed to have a slider 9 and a boot 11, the first and second plugs 5 and 6 may be constructed with the slider 9 and boot 11 omitted. However, by a housing of the slider 9, etc., being provided to accommodate the frame 10 and a boot 11 being provided to collectively accommodate multi-fiber optical fiber ribbons 43 of the first and second optical connector groups 3 and 4, it is possible to very easily handle the first and second optical connector groups 3 and 4. Furthermore, in the abovementioned preferred embodiment, although the adapter 8 and the first and second plugs 5 and 6 are connected together so as to be detachable by inserting the claw portion 15 of the adapter 8 into the projection portion 16 of the first and second plugs 5 and 6, the adapter 8 may be connected to the first and second plugs 5 and 6 by any suitable means other than the above means.

The number of optical fiber arrays of the first and second optical connector groups 3 and 4 connected by a collective connection structure of a plurality of optical connectors according to the invention, the number of optical connectors thereof, and the size thereof, are not particularly limited.

INDUSTRIAL APPLICABILITY

As described above, the collective connection structure of a plurality of optical connectors, an optical connector arraying member, and an adapter according to the invention are suitable for easy, collective, and accurate connections of a plurality of multi-fiber optical connectors at terminals of optical lines such as optical cables, etc., in a field of optical transmission systems.

What is claimed is:

1. A collective connection structure of a plurality of optical connectors which collectively connect a first optical connector group in which a plurality of optical connectors are arrayed in a first optical connector arraying member in a stacked state and a second optical connector group in which a plurality of optical connectors are arrayed in a second optical connector arraying member in a stacked state, via an adapter equipped with guide portions, in such a state where the connection end faces of the respective first and second optical connector groups are opposed to each other;

wherein the connection end face sides of the first and second optical connector groups protrude from the tip ends of the first and second optical connector arraying members corresponding thereto in a state where said connection end face sides are prevented from dropping;

wherein said first and second optical connector groups are arrayed in a float-like state in the X direction orthogonal to an optical axis of optical connectors and Y direction with respect to the first and second optical connector arraying members corresponding thereto, the respective connection end face sides of the first and second optical connector groups, respectively, protruding from the first and second optical connector arraying members are inserted from both sides of said adapter, the connection end face sides of the first and second optical connectors are position-regulated in said X direction and Y direction of optical connectors of the respective connection pairs in the first and second optical connector groups by a guide portion of each of the optical connectors provided in a plurality at said adapter, whereby the first and second optical connector groups are collectively connected;

wherein a plurality of connector inserting holes into which the respective optical connectors of optical connector groups are inserted are arrayed and formed in a stacked state in an optical connector arraying member, the respective optical connectors of the optical connector groups inserted into the connector inserting hole are engaged with a drop preventing portion secured in the connector inserting hole so as not to skip off therefrom, the connection end face sides of the respective optical connectors are caused to protrude from the tip end of the connector inserting hole, an inserting hole is formed on a wall surface of the respective connector inserting holes, a stopper is inserted from the rear end side of the respective connector inserting holes into the respective connector inserting holes, the latch portion secured on the outer circumferential surface of said stopper is engaged with said inserting hole to cause the stopper to be attached into the connector inserting holes, and wherein a spring which presses optical connectors toward the tip end of the connector inserting hole is accommodated in a space between the tip end of said stopper and the rear end side of the optical connectors.

2. An optical connector arraying member used for a collective connection structure as set forth in claim 1, wherein a plurality of connector inserting holes which accommodate the respective optical connectors of optical connector groups in a float-like state in the X direction orthogonal to the optical axis of the optical connectors and Y direction are arrayed and formed in a stacked state, a drop preventing portion which prevents optical connectors inserted into the respective connector inserting holes from dropping toward the tip end side of insertion is provided in said respective connector inserting holes, an inserting hole is formed on a wall surface of the respective connector inserting holes, a stopper is inserted from the rear end side of the respective inserting holes into said respective inserting holes, a latch portion secured on the outer circumferential surface of said stopper is engaged with said inserting hole, said stopper is attached into the connector inserting holes, and a spring which presses optical connectors toward the tip end side of the connector inserting holes is accommodated in a space between the tip end of said stopper and the rear end side of the optical connectors.

3. An adapter used for a collective connection structure as set forth in claim 1, wherein a plurality of guide portions which regulates positions in the X direction orthogonal to the optical axis of optical connectors and Y direction with respect to the respective optical connectors of the first and second optical connector groups inserted from both sides of said adapter into said adapter are formed so as to protrude in a direction along which receives inserting of optical connectors, and the entire body including the guide portions are formed of a material containing a conductive material.

* * * * *

UNITED STATES PATENT AND TRADEMARK OFFICE
CERTIFICATE OF CORRECTION

PATENT NO. : 6,220,762 B1
DATED : April 24, 2001
INVENTOR(S) : Kanai et al.

It is certified that error appears in the above-identified patent and that said Letters Patent is hereby corrected as shown below:

Title page,
Item [63], the date filing should read : Feb. 5, -- 1999 --

Abstract,
Line 1, "prevent" should read -- present --

Signed and Sealed this

Twentieth Day of November, 2001

*Attest:*

*Attesting Officer*

NICHOLAS P. GODICI
*Acting Director of the United States Patent and Trademark Office*